Figure 1:
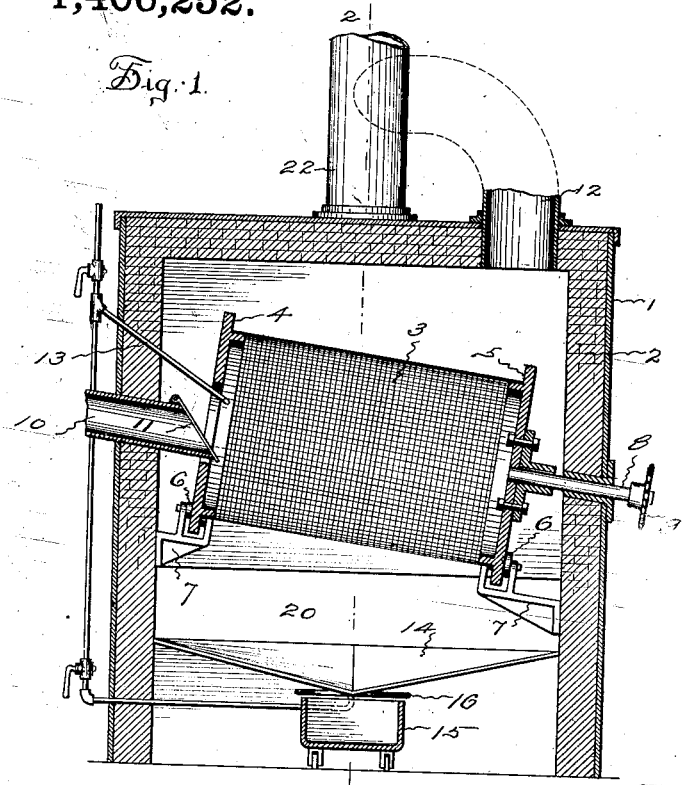

M. K. WEILL AND M. L. CORNELL.
METHOD OF AND APPARATUS FOR SEPARATING METAL FROM PAPER.
APPLICATION FILED AUG. 19, 1920.

1,406,252.   Patented Feb. 14, 1922.

UNITED STATES PATENT OFFICE.

MELVILLE K. WEILL, OF BROOKLYN, AND MILTON L. CORNELL, OF NEW YORK, N. Y., ASSIGNORS TO BEECH-NUT PACKING COMPANY, OF CANAJOHARIE, NEW YORK, A CORPORATION OF NEW YORK.

METHOD OF AND APPARATUS FOR SEPARATING METAL FROM PAPER.

1,406,252.     Specification of Letters Patent.     Patented Feb. 14, 1922.

Application filed August 19, 1920. Serial No. 404,613.

*To all whom it may concern:*

Be it known that we, MELVILLE K. WEILL and MILTON L. CORNELL, citizens of the United States, said WEILL residing at Brooklyn, in the county of Kings and State of New York, and said CORNELL residing at New York, in the county of New York and State of New York, having invented a new and useful Improvement in Methods of and Apparatus for Separating Metal from Paper, of which the following is a specification.

Cigarettes, cigars, tobacco, chewing gum, chocolate, candy and like confections, cheese, photographic plates, films and other commodities, for ensuring their preservation in prime condition, are packaged in wrappers consisting of tinfoil and paper. In the manufacture of these wrappers large continuous sheets of tinfoil and paper, which is frequently waxed, are passed through machines which by heat and pressure or by the application of glue or other adhesive, cause the sheets to adhere to each other. In some instances the entire surface of the paper is coated with adhesive and in others the adhesive is applied in stripes. During the formation of these wrappers, for instance when the machines are starting up and being adjusted, and as a result of cutting and trimming and other necessary wastage and faults, a considerable amount of waste material accumulates.

Previously it has been the custom in reclaiming the metal to place the waste pieces in a receptacle and set fire to the paper so that it will be consumed and the metal melted and allowed to collect in the bottom of the receptacle while the burning mass is manually agitated. With this old method some metal is vaporized, a considerable proportion of the molten metal is retained in the ashes and lost, and such metal as is reclaimed is mixed with an undesirable quantity of ash and is so oxidized that when treated to put it into form for reuse there is a large amount of dross.

The object of the present invention is to provide an economical process and apparatus for reclaiming the metal from such scrap or waste by the use of which the inflammable material will be rapidly consumed and the metal quickly made molten and separated from the mass and ash and collected with less loss and in better condition for reworking than is possible with the prior methods.

This object is attained by igniting the inflammable element of a quantity of waste paper and tinfoil, mechanically agitating the burning mass so as to open it up and allow free access of oxygen for supporting combustion and permitting the easy and quick separation and escape by gravity of the metal melted by the heat of the burning mass, and carrying off ash and other light matter from the molten metal by a sufficiently strong cross current of air through which the molten metal is caused to drop.

In carrying out the process the scrap wrapper, consisting of the paper and adhered foil, may be blown or otherwise fed to a rotatory or oscillatory or fixed cylindrical screen or drum, or other suitable perforated support, and the paper ignited. While the paper is burning the mass is agitated by revolving or oscillating the screen or drum in case such is used, or by vibrating or feeding the grate if such is employed, or by stirring the mass with a mechanical mixer if the receiving element for the material is stationary. This agitation keeps the mass open and the pieces separated so that sufficient oxygen can enter to ensure complete and quick combustion of the paper, and it also allows the melted metal to easily and freely work down and through the screen or grate or out of the drum. As the metal drops it is subjected to a cross current of air which blows such ash as also drops, into a receiving chamber or bin and allows the cleaned metal to collect on a plate or trough which conducts it to a suitable container. The cross air flow, as well as carrying off all light foreign matter, chills the metal so as to retard its oxidation, and it also can, if desired, be employed to assist the draught and promote combustion of the burning mass.

Figure 2:
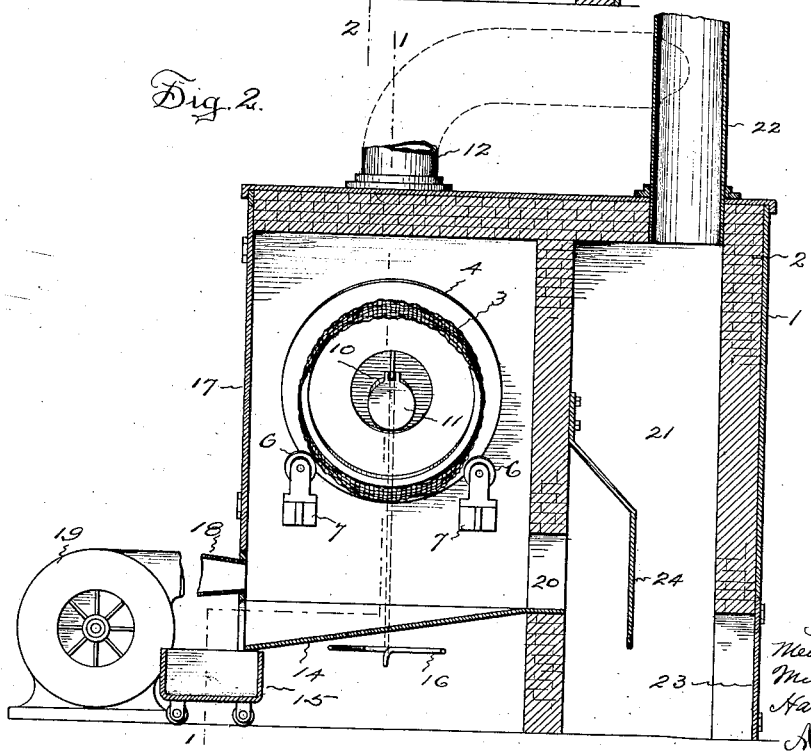

Only one form of apparatus which has been contemplated for practicing this invention will be illustrated and described, although of course the process may be carried out by other arrangements of elements as above indicated. In the accompanying drawings Fig. 1 shows a longitudinal, vertical section of the form of apparatus chosen to visualize the conception, the section being taken on the plane indicated by the dotted line 1—1 on Fig. 2. Fig. 2 shows a transverse, vertical section of the same apparatus taken on the plane indicated by the dotted line 2—2 on Fig. 1.

The apparatus illustrated comprises a furnace which may be built of any suitable material, for instance with metal walls 1, or fire brick walls 2, or a combination of both as shown in the drawings, with convenient openings and doors to permit access to the interior. In the furnace is a rotatable screen which is shown as formed of a cylinder of heavy wire mesh 3 removably secured to heads 4 and 5. This screen is arranged on an inclined axis to facilitate the movement of the mass from the feeding end and the escape of the metal, in any suitable manner, for instance the heads may rest upon rollers 6 mounted on brackets 7 secured to the walls of the furnace. The lower end of the cylinder is desirably closed by the head 5 which is secured to a shaft 8 that extends through the furnace wall and is provided on the outside with means for rotating it, which means may be a sprocket wheel 9 or any other element by which the shaft may be connected with a motive mechanism. The head 4 at the upper end of the cylinder has an opening through it, and extending through the wall of the furnace to or into the opening, is a feed pipe 10 that may contain or be connected with any common and suitable means for feeding or blowing the waste material to be treated into the cylinder. At the lower end of the feed pipe is a valve 11 which normally closes the pipe so as to prevent back fire of the material being fed through the pipe.

A smoke pipe 12 opens through the top wall of the furnace, preferably over the lower end of the cylinder. Extending through the front wall of the furnace and projecting toward or into the open end of the cylinder may be a gas pipe 13 by means of which flame may be provided for igniting the paper, which, however, when once ignited burns until all is consumed.

Below the cylinder is a metal apron 14. The apron is located and shaped to collect the molten metal which drops through the rotatable cylindrical screen, and cause it to flow to a receptacle 15 placed below the lowest point of the apron. The apron is supported by the walls of the furnace in any convenient manner and may be kept warm to assist the flow of the metal by flames from the gas burner 16, or any other convenient source of heat.

At the front the furnace may have a hinged door 17 that when opened permits access to the screen. There is an opening through the front wall of the furnace above the level of the apron and below the screen and communicating with this opening is the discharge pipe 18 of a fan or blower 19 of suitable capacity to produce the required cross current of air through which the molten metal falls when dropping from the screen. At the back of the furnace and communicating therewith by an opening 20 opposite the blower opening and above the apron is a chamber 21 into which ashes blown from the dropping material by the cross air current are delivered. An air escape pipe 22 leads from the top of this chamber. The air escape pipe may open to the atmosphere or may, as illustrated by dotted lines, merge with the furnace pipe 12 before they reach the smoke stack. In the wall of the ash chamber is a door 23 by means of which ashes may be removed, and in the chamber opposite and extending down below the opening from the furnace is a baffle plate 24 which is designed to direct the ash laden air currents downward and reduce their velocity before they pass upward to the escape pipe, so that all solid matter carried by the air will be deposited in the lower part of the chamber.

With the particular form of apparatus illustrated and described the scraps of foil and paper may be fed into the furnace as frequently as desired. The mass of waste is continually agitated in the cylinder so that sufficient oxygen will be admitted to ensure the complete combustion of all of the paper. This agitation also assists in the disintegration of the pieces and separation of the metal from the paper, at the same time exposing the metal and paper to the flames so the paper will be rapidly burned and the metal quickly melted. The metal being heavier than the ash quickly settles to the bottom of the screen through which it passes and drops through the cross current of air onto the apron below. The air current is of sufficient strength to carry away all of the fine ashes and dust so that the metal which drops on the plate and flows down to the gathering receptacle is very clean. The ash is deposited in the ash chamber and the air flow assists the draught which is necessary to ensure proper combustion of the burning paper. This process can be carried on continuously as long as waste material is fed into the furnace.

The invention claimed is:

1. The method of reclaiming metal from paper to which it is adhered, which consists in igniting a mass of paper and metal foil, agitating the mass while the paper is burning, and allowing the metal which is melted from the mass by the burning of the paper to drop through a current of air of sufficient intensity to carry off all solid matter except the metal.

2. The method of reclaiming the metal of foil from the paper to which it is adhered, which consists in continuously feeding scraps of paper and metal foil, agitating the fed mass of paper and foil, burning the paper from the agitated mass and liquefying the foil by the flames of the burning paper, screening the molten metal from the burning paper and dropping the screened molten metal through a current of air of sufficient intensity to carry off all solid matter except the metal.

3. The method of reclaiming metal from paper to which it is adhered, which consists in igniting a mass of paper and metal foil, agitating the mass while the paper is burning and liquefying the metal by the burning of the paper, and dropping the molten metal through a cross current of air which chills the metal and carries off foreign solid matter.

4. The method of reclaiming metal from paper to which it is adhered, which consists in igniting a mass of paper and metal foil, agitating the mass while the paper is burning and melting the metal by the burning of the paper, allowing the molten metal to drop through a cross current of air, and flowing the particles of dropped metal together.

5. The method of reclaiming thin sheet metal from paper, which consists in igniting the paper, agitating the metal and paper while the paper is burning, dropping the molten metal, and blowing ash from the metal as it drops.

6. The method of reclaiming metal from paper, which consists in igniting a mass of paper and metal foil, agitating the mass while the paper is burning, allowing the metal which is melted from the mass by the burning of the paper to drop, blowing air through the molten metal and conducting the blown air so that it will assist in the combustion of the paper.

7. The method of reclaiming the metal of foil from paper, which consists in igniting a mass of paper and metal foil, precipitating the metal which is melted from the mass by the burning of the paper, and blowing air through the falling molten metal.

8. The method of reclaiming the metal of foil from paper, which consists in subjecting the foil and paper to the action of flame, thereby consuming the paper and releasing the metal, and dropping the residue through a current of air which separates the ash from the metal.

9. The method of reclaiming the metal of foil from paper which consists in burning the paper and separating the ash from the metal by air currents.

10. An apparatus for reclaiming metal from paper adhered thereto which comprises means for receiving and agitating a mass of paper and foil while the paper is burning and the foil is melting, means for screening the molten metal from the mass and allowing it to drop by gravity, and means for producing an air current across the dropping molten metal.

11. An apparatus for reclaiming metal from paper adhered thereto, which comprises a screen for receiving a mass of paper and foil, means for agitating the screen while the paper is being burned and the foil melted, means for collecting the molten metal that drops through the screen, and means for producing an air current between the screen and the collecting means for removing dust and ash from the metal as it drops from the screen to the collecting means.

12. An apparatus for reclaiming the metal of foil from paper adhered thereto, which comprises a rotatable screen for containing a mass of paper and foil, means for rotating the screen while the paper is being burned and the foil melted, means for collecting the molten metal that drops through the rotating screen, and means for blowing air between the screen and the collecting means for removing dust and ash from the metal as it drops from the screen to the collecting means.

13. An apparatus for reclaiming the metal of foil from paper adhered thereto, which comprises a rotatable screen for containing a mass of paper and foil, means for rotating the screen while the paper is being burned and the foil melted, an apron for collecting the molten metal that drops through the screen, means for heating said apron, and means for producing a cross current of air below the screen for removing dust and ash from the metal as it drops from the screen to the apron.

14. An apparatus for reclaiming the metal of foil from paper adhered thereto, which comprises a rotatable screen for containing a mass of paper and foil, means for rotating the screen while the paper is being burned and the foil melted, an apron for collecting the molten metal that drops through the screen, and means for producing a cross current of air below the screen for removing dust and ash from the metal as it drops from the screen to the apron.

15. An apparatus for reclaiming the metal of foil from paper adhered thereto, which comprises a rotatable screen mounted in an inclined axis, means for rotating the screen, means below the screen for collecting molten metal, and means for producing a cross current of air between the screen and the said collecting means.

MELVILLE K. WEILL.
MILTON L. CORNELL.